Nov. 14, 1950     G. E. BRYANT     2,530,150
DRAGLINE EXCAVATING APPARATUS
Filed Dec. 18, 1946     2 Sheets-Sheet 1
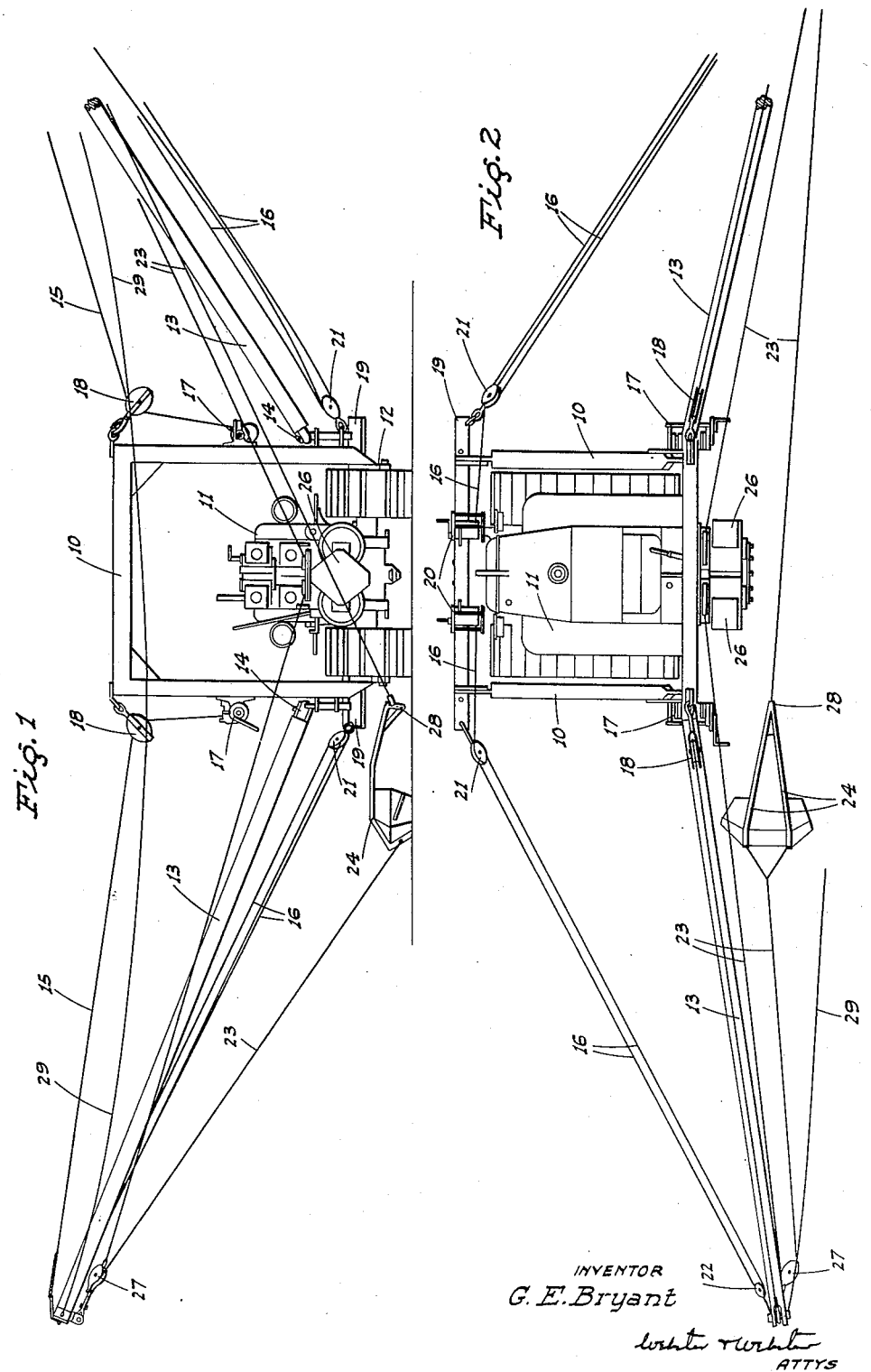
INVENTOR
G. E. Bryant
ATTYS Nov. 14, 1950          G. E. BRYANT          2,530,150
DRAGLINE EXCAVATING APPARATUS
Filed Dec. 18, 1946          2 Sheets-Sheet 2
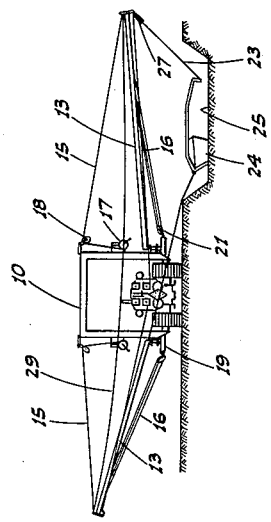
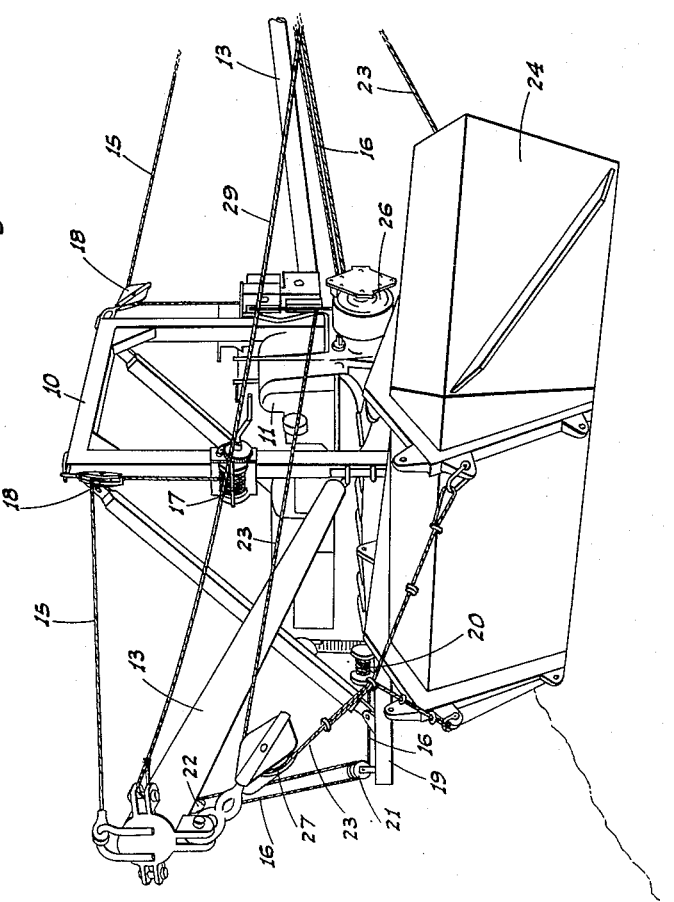
INVENTOR
G. E. Bryant
Webster & Webster
ATTYS

Patented Nov. 14, 1950

2,530,150

UNITED STATES PATENT OFFICE 2,530,150

DRAGLINE EXCAVATING APPARATUS

George E. Bryant, Rydalmere, New South Wales, Australia, assignor to R. G. Letourneau, Inc., Stockton, Calif., a corporation of California Application December 18, 1946, Serial No. 716,913
In Australia December 21, 1945

2 Claims. (Cl. 37—116)

This invention relates to means for removing sand and the like from irrigation channels particularly in areas wherein soil erosion due to wind effects occurs.

An object of the present invention is to provide means whereby channels of the above nature may be cleaned by mechanical means which are self contained and are easily and rapidly transported to places often miles apart.

It is believed that there are not any known types of mechanical equipment similar to that which is the subject of the present invention, for removing sand and the like from irrigation channels.

The present invention is particularly applicable to a chain plate tractor capable of being traversed parallel to the sides of the channel from which sand and the like are to be removed.

The cable system of the device is such that adjustments to the position of the apparatus or any single component of the apparatus can be rapidly and positively made, and at the same time the scoop is readily controlled in a rapid forward and reverse travel.

In order that the invention may be more readily understood, reference will now be made to the accompanying drawings wherein:

Figure 1 is a front elevational view of the invention.

Figure 2 is a plan view thereof.

Figure 3 is a detail perspective view illustrating the scoop and boom assembly.

Figure 4 is a diagrammatic view illustrating the device in operation.

The invention as illustrated consists of a rigid main frame 10 fixed to a suitable tractor 11 by trunnion spools 12 which are attached by means of bolts to the chassis frame of the tractor 11.

Two booms 13 are attached to the main frame 10 by means of universal joints 14 the said scoop booms 13 extending one from each side of the said main frame 10 of the device in an outwardly and rearwardly direction of the tractor 11 and are supported and braced by vertical adjustment cables 15 and brace cables 16.

The said brace cables 16 are also used to adjust the position of the said booms 13 in a horizontal plane about the universal joints 14.

A pair of winches 17 is attached to the respective side members of the main frame 10 and each winch 17 has a boom adjusting cable 15 referred to above for effecting vertical adjustment of the said boom 13. The free end of the said cables 15 is passed over a swivel guide sheave 18 which is attached to the top side of the respective main frame 10, said cable 15 thence passes to the end of the respective scoop booms 13 where it is anchored.

The respective winches 17 and boom adjustment cables 15 are used to raise or lower the respective booms 13 in a vertical plane.

A front frame member 19 is attached to the front of the tractor by means of bolts, and carries two winches 20 and two swivel cross over sheaves 21 which are used to control the respective boom brace cables 16.

One end of each of the said boom brace cables 16 is fixed to the respective winches 20 and the other end thereof is passed under a cross over double sheave 21 to the inside of a swivel guide sheave 22 which latter is attached to the end of the respective booms 13 and passes back through the outer side of the cross-over sheave 21 and thence back to the swivel guide sheave 22 to which the end of the said boom brace cable 16 is anchored.

The said boom brace cable 16 and the winch 20 enable the respective booms 13 to be adjusted rearwardly or forwardly of the tractor 11 in a horizontal plane, while another pair of cables 23 termed for convenience scoop cables, are used to control the scoop 24 when moved in a forward and backward motion across a channel 25, Figure 4.

The tractor 11 is provided with a known form of double cable drum rear winch unit 26 termed for convenience, the tractor winch, from which the scoop cable 23 is controlled; one of the said cables 23 being attached to each of the said winch drums of the tractor and being led in opposite directions to respective scoop guide swivel sheaves 27 which are attached to respective ends of the said scoop booms 13 said cables thence passing to respective sides of the scoop 24 where they are anchored.

Adjusting positions 28 are formed on the leading end of the scoop 24 to enable the cutting and working angle of the said scoop 24 to be altered at will.

A boom spacer cable 29 is used to fix the scoop booms 13 at predetermined distances apart.

In operation (see Figures 3 and 4) one scoop boom 13 extends over the channel 25 to be cleaned while the other scoop boom 13 extends in the opposite direction. For clearing the sand from the said channel 25 the scoop 24 is drawn backwards and forward across the channel by operating the tractor winch drums 26 first in one direction and then in the reverse direction whereby the scoop removes the sand to one bank for disposal.

When the device as described above is not in use, or when it is to be moved from place to place the scoop booms 13 are placed forwardly parallel to the tractor by releasing the boom spacer cable 29 and the scoop 24 from the scoop cable 23 and then inhauling each boom brace cable 16 into its respective winch 20 until the said scoop booms 13 lie parallel to the tractor. Finally each scoop boom 13 is lowered by respective vertical adjustment boom cables 15 from respective winches 17 until the respective booms 13 are resting on the front chassis frame 19. It will be appreciated that the invention may be used for many purposes where soil or material is to be removed.

What is claimed is:

1. An excavating apparatus comprising the combination with a tractor, of an upstanding frame fixed to the tractor, an outwardly projecting boom on each side of the frame, a universal connection between the inner end of each boom and the frame, a double acting power winch on the tractor, a pulley at the outer end of each boom, a scoop, a cable secured to each end of the scoop and reeved through one of said pulleys and connected with the power winch, the latter being operative to alternately pull on and release such cable, and separate cable means connected with the outer end of each boom and operative to support such boom and to effect adjustment thereof about the universal joint to selectively different positions; said last named means comprising a winch on each side of the frame, a pulley on the frame above each winch, a cable extending from each such last named winch about the pulley above and thence to and being anchored on the outer end of the corresponding boom, another frame on the tractor spaced lengthwise thereof from the first named frame, a pair of winches mounted on said last named frame, a pulley on said last named frame laterally out from each of said last named winches, and a cable secured to each of said last named winches and reeved through one of the last named pulleys and extending thence to a connection with one of the booms at its outer end.

2. A structure as in claim 1 in which the second named frame on the tractor extends laterally beyond each side of the first named frame whereby the booms may be lowered to rest on said extensions.

GEORGE E. BRYANT.

REFERENCES CITED

The following references are of record in the file of this patent:

UNITED STATES PATENTS

| Number | Name | Date |
|---|---|---|
| 825,200 | Dunlop | July 3, 1906 |
| 1,219,371 | Butterfield | Mar. 13, 1917 |
| 1,464,454 | Thompson | Aug. 7, 1923 |
| 1,636,136 | Kernes | July 19, 1927 |